US012060142B2

(12) United States Patent
Harada et al.

(10) Patent No.: US 12,060,142 B2
(45) Date of Patent: Aug. 13, 2024

(54) OUTBOARD MOTOR

(71) Applicant: HONDA MOTOR CO., LTD., Tokyo (JP)

(72) Inventors: Yoshihiro Harada, Wako (JP); Tsuyoshi Yoshigasaki, Wako (JP); Hiroshi Yamamoto, Wako (JP); Yuki Hase, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 373 days.

(21) Appl. No.: 17/441,715

(22) PCT Filed: Mar. 29, 2019

(86) PCT No.: PCT/JP2019/014213
§ 371 (c)(1),
(2) Date: Sep. 22, 2021

(87) PCT Pub. No.: WO2020/202328
PCT Pub. Date: Oct. 8, 2020

(65) Prior Publication Data

US 2022/0194539 A1 Jun. 23, 2022

(51) Int. Cl.
*B63H 20/32* (2006.01)
*F02B 61/04* (2006.01)

(52) U.S. Cl.
CPC ........... *B63H 20/32* (2013.01); *F02B 61/045* (2013.01)

(58) Field of Classification Search
CPC .............................. B63H 20/32; F02B 61/045
See application file for complete search history.

(56) References Cited

U.S. PATENT DOCUMENTS

| | | | | |
|---|---|---|---|---|
| 3,955,526 A * | 5/1976 | Kusche | B63H 20/32 123/195 P |
| 11,760,458 B2 * | 9/2023 | Hasegawa | F02M 35/167 123/184.21 |
| 2004/0018785 A1 | 1/2004 | Yasuda et al. | |
| 2014/0370768 A1 | 12/2014 | Shomura et al. | |

FOREIGN PATENT DOCUMENTS

| | | |
|---|---|---|
| JP | 2004-050921 | 2/2004 |
| JP | 2007-269167 | 10/2007 |
| JP | 2015-001211 | 1/2015 |

OTHER PUBLICATIONS

International Search Report and Written Opinion for International Application No. PCT/JP2019/014213 mailed on Apr. 23, 2019, 10 pages.

* cited by examiner

*Primary Examiner* — Anthony D Wiest
(74) *Attorney, Agent, or Firm* — Amin, Turocy & Watson, LLP

(57) ABSTRACT

An outboard motor comprises an engine and a cover that covers the periphery of the engine. The cover includes an outer cover that defines an outer appearance and an inner cover that covers the engine inside the outer cover. The outer cover comprises an outer side division structure that can be divided into a plurality of parts, and the inner cover has a structural part providing access to the engine.

8 Claims, 5 Drawing Sheets

OUTBOARD MOTOR

TECHNICAL FIELD

The present invention relates to an outboard motor having a periphery of its engine covered by a cover.

BACKGROUND ART

An outboard motor comprises: an engine that rotates a propeller; and a cover that covers each of configurations of the outboard motor including the engine. The cover serves functions of suppressing flooding of each of the configurations of the outboard motor, suppressing salt damage of each of the configurations during sea navigation, protecting a user from vibration or temperature rise of the engine, and so on.

For example, the cover (an engine cover) disclosed in JP 2007-269167 A places on a lower cover covering a lower portion and exhaust system of the engine an upper cover covering front, rear, left, right and upper portions of the engine, and thereby covers an entire periphery of the engine. Moreover, the outboard motor disclosed in JP 2007-269167 A comprises an inner cover (a first cover) that further covers the engine on an inner side of the engine cover.

SUMMARY OF INVENTION

Upon pre-operation checking or maintenance in this kind of outboard motor, attachment/detachment (removal and fitting) of the cover of the outboard motor installed in a stern is performed by the user. In a configuration where the cover unitarily covers the engine as described above, a great amount of labor is required of the user since the cover is large and heavy. Particularly, in recent years, increases in size of the engine are causing cover size too to increase, and labor too to increase.

The present invention, which relates to the above-described outboard motor technology, has an object of providing an outboard motor enabling labor of inspection or maintenance to be reduced by a simple configuration.

In order to achieve the previously-described object, one aspect of the present invention is an outboard motor comprising an engine and a cover, the cover covering a periphery of the engine, the cover including: an outer cover that configures an outward appearance; and an inner cover that covers the engine on an inner side of the outer cover, the outer cover being an outer side division structure that can be divided into a plurality of parts, and the inner cover having a structural portion allowing access to the engine.

In the above-described outboard motor, by an outer cover that configures an outward appearance in a periphery of an engine being an outer side division structure, it becomes possible for some of parts to be attached/detached by a user during inspection or maintenance. Meanwhile, an inner cover facilitates access to the engine via a structural portion. Hence, the outboard motor enables labor of inspection or maintenance to be significantly reduced by a simple configuration.

DESCRIPTION OF EMBODIMENTS

Preferred embodiments of the present invention will be presented and described in detail below with reference to the accompanying drawings.

First Embodiment

Figure 1:
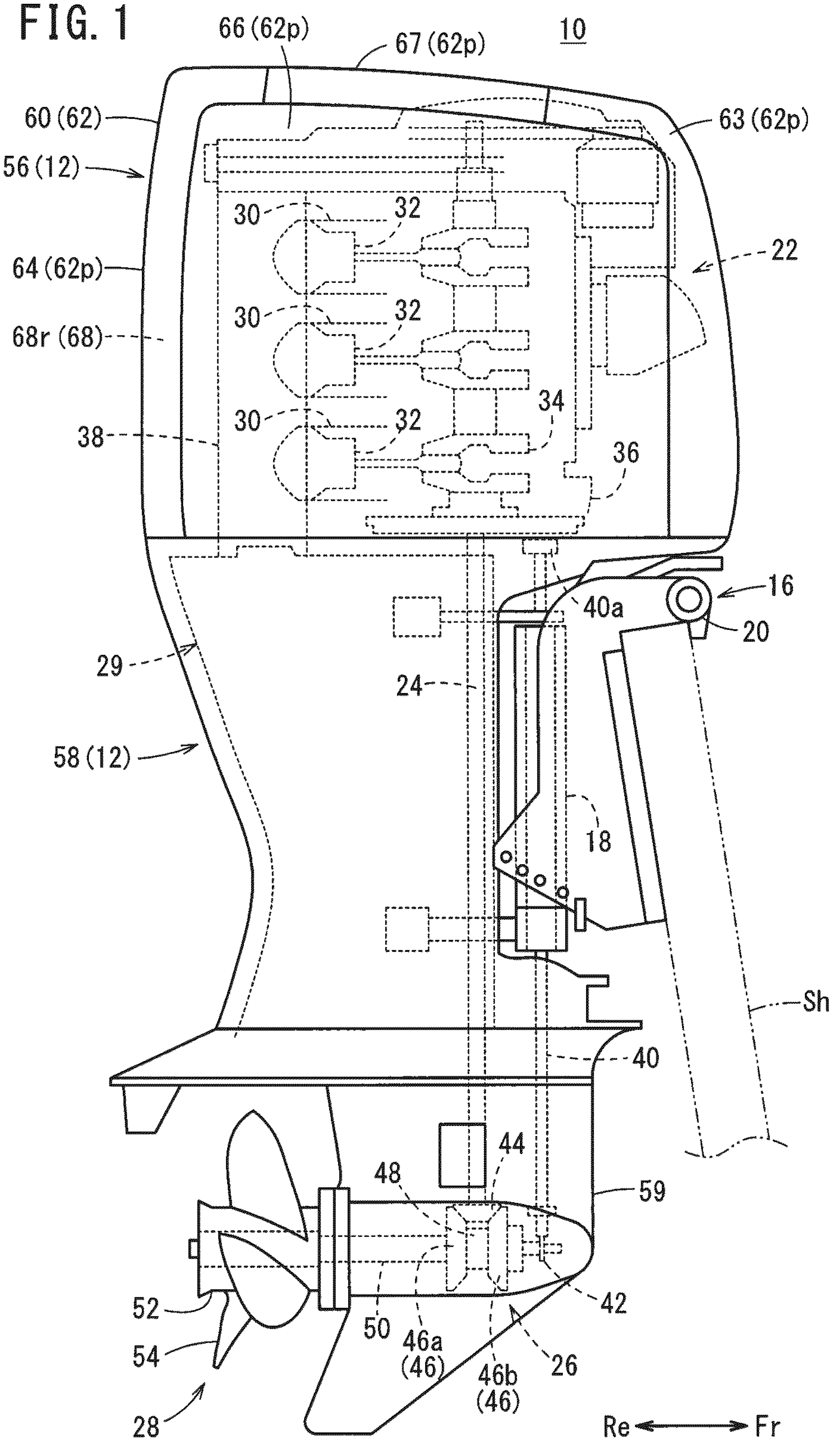
FIG. 1 is a side view showing an overall configuration of an outboard motor according to a first embodiment of the present invention.

An outboard motor 10 according to a first embodiment of the present invention, which, as shown in FIG. 1, is mounted on a ship body Sh as a power source of a small ship or the like, is driven under operation of a user to propel the ship body Sh. The outboard motor 10 comprises: a cover 12 that houses each of configurations of said outboard motor 10; and a mounting mechanism 16 by which the outboard motor 10 is, forward (on an arrow Fr direction side) of the cover 12, fixed to the ship body Sh.

The mounting mechanism 16 enables the cover 12 to swing to left and right around a swivel shaft 18 in planar view, and enables the cover 12 to revolve clockwise in FIG. 1 or counterclockwise in FIG. 1 about a tilt shaft 20. The outboard motor 10 has its propeller (fins 54) positioned below a water surface in a state where an up-down direction of the cover 12 extends in substantially a vertical direction. Positions, directions, and so on, of each of the configurations will be described below based on a posture of the outboard motor 10 in FIG. 1.

Inside the cover 12, there are provided an engine 22 (an internal combustion engine), a drive shaft 24, a gear mechanism 26, and a propeller mechanism 28. Furthermore, in a lower portion of the engine 22, the outboard motor 10 has an unillustrated exhaust system allowing an exhaust gas of the engine 22 to flow, and has a cooling structure 29 that cools the engine 22 and the exhaust gas.

The cooling structure 29 is configured by laminating a plurality of cases inside the cover 12, for example. The cooling structure 29 may have a silencing function where, by allowing cooling water (water such as sea water or fresh water that has been taken in from outside of the outboard motor 10) to flow in a periphery of an exhaust pipe (not illustrated) of the exhaust gas, the cooling structure 29 causes exhaust noise of the exhaust gas to be reduced.

As the engine 22, there is applied a multi-cylinder engine (for example, a V-type engine) comprising a plurality of cylinders 30 along an up-down direction of the outboard motor 10. The engine 22 has a posture that axis lines of each of the cylinders 30 are positioned sideways-facing (substantially horizontally) therein, and that there is extended therein in the up-down direction a crankshaft 34 which is coupled to piston rods 32 of each of the cylinders 30. Moreover, a cylinder block 36 and a cylinder head 38 of the engine 22 are provided with a cooling water jacket (not illustrated) that cools the engine 22 by distribution of the cooling water of the cooling structure 29. Note that although the number installed of the cylinders 30 of the engine 20 is not specifically limited, it may be set to a number allowing a desired driving force (horsepower) to be obtained in the outboard motor 10.

The crankshaft 34 of the engine 22 is coupled to an upper end of the drive shaft 24. The drive shaft 24 extends in the up-down direction along an inside of the cover 12, and rotates about its own axis with rotation of the crankshaft 34. A lower end of the drive shaft 24 is housed in the gear mechanism 26.

The gear mechanism 26 converts the driving force of the engine 22 under operation of an operating shaft 40, and thereby rotates the propeller mechanism 28 and causes the ship body Sh to move forward or move in reverse. The operating shaft 40 rotates due to a shift actuator 40*a* that drives in response to a shift operation of the user, for example.

The gear mechanism 26 causes a shift slider 42 to advance/retract in an axial direction of the propeller mechanism 28 (a propeller shaft 50) due to rotation of the operating shaft 40. As a result, the shift slider 42 moves a dog clutch 48 between a pair of driven bevel gears 46 (a forward-movement driven bevel gear 46*a*, a reverse-movement driven bevel gear 46*b*) that mesh with a drive bevel gear 44 coupled to the drive shaft 24. Then, a tooth surface of the dog clutch 48 meshes with one of an inner side tooth surface of the forward-movement driven bevel gear 46*a* or an inner side tooth surface of the reverse-movement driven bevel gear 46*b*, whereby the driving force of the engine 22 is transmitted to the propeller mechanism 28 via the dog clutch 48 and the later-described propeller shaft 50.

The propeller mechanism 28 has: the propeller shaft 50 which is tubular and has the shift slider 42 inserted therein; a tubular body 52 which is coupled to an outer side in a radial direction of the propeller shaft 50; and a plurality of the fins 54 that are coupled to an outer peripheral surface of the tubular body 52. The propeller mechanism 28 rotates each of the fins 54 clockwise or counterclockwise, with the propeller shaft 50 rotating due to the gear mechanism 26 acting as a rotational center, and thereby causes the ship body Sh to move forward or move in reverse.

In the above outboard motor 10, each of the configurations of the outboard motor 10 are covered by the above-described cover 12, and this cover 12 has: an upper surrounding portion 56 that mainly covers the engine 22 positioned in an upper portion of the outboard motor 10; and a lower surrounding portion 58 that mainly covers a configuration (the cooling structure 29) further to a lower portion side of the outboard engine 10 than the engine 22. The upper surrounding portion 56 and the lower surrounding portion 58, which are fixed to a mounting frame (unillustrated) for mounting the engine 22, are divided with the mounting frame being a boundary, for example.

The lower surrounding portion 58 is configured so as to unitarily cover front/rear and left/right of the cooling structure 29, and this results in rigidity of the lower surrounding portion 58 being raised. A gear case 59 forming the gear mechanism 26 is coupled and fixed to a lower end of the lower surrounding portion 58. Note that the lower surrounding portion 58 may be configured as a division structure, similarly to the upper surrounding portion 56.

Figure 2:
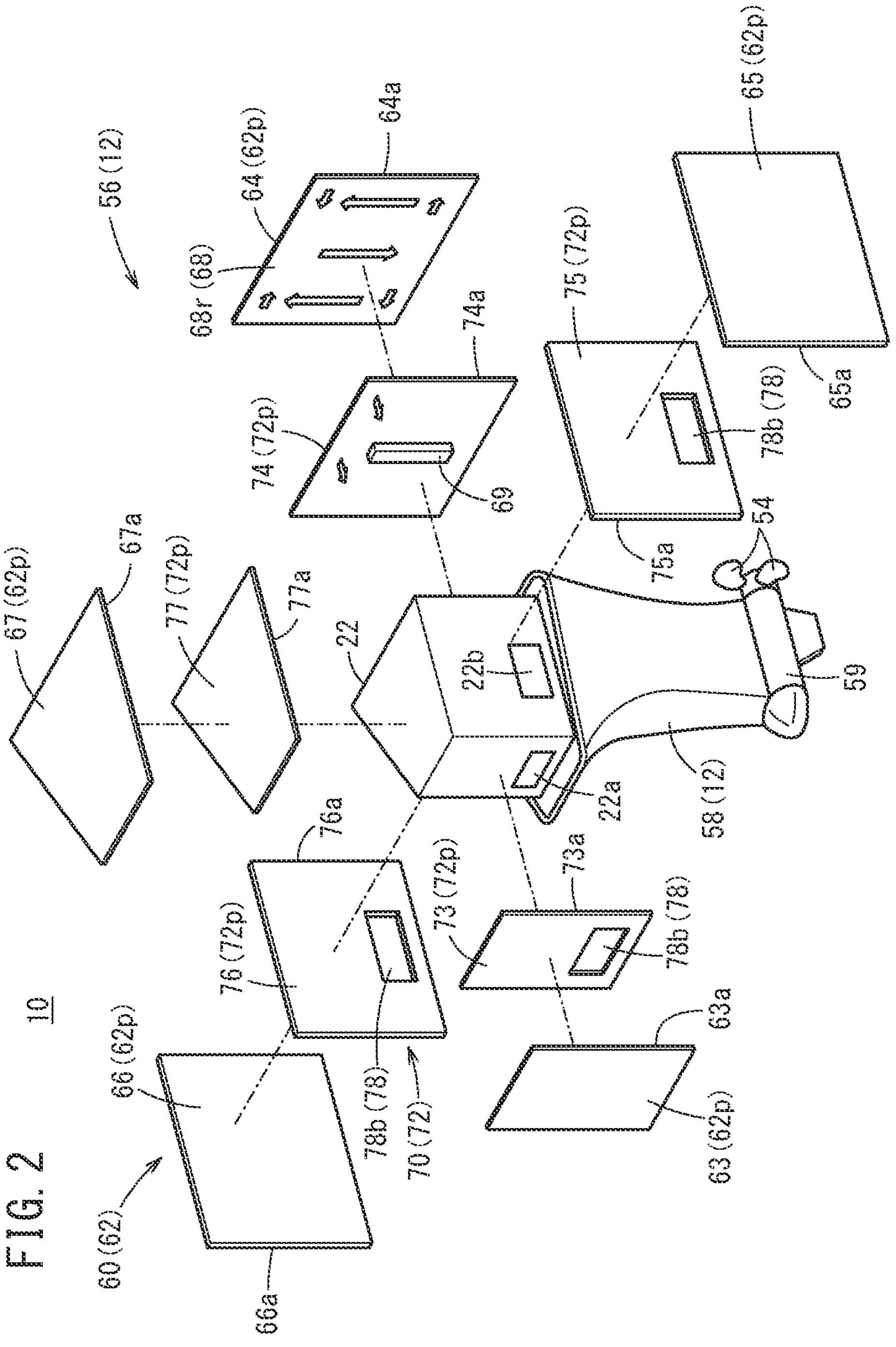
FIG. 2 is a schematic exploded perspective view showing disassembled each of parts of an outer cover and an inner cover.

As shown in FIG. 2, the upper surrounding structure 56, which is a configuration covering frontward, rearward, leftward, rightward, and upward of the engine 22, is connected to an upper end of the lower surrounding structure 58 or an outer surface of the lower surrounding structure 58. The upper surrounding structure 56 is configured by: an outer cover 60 that forms an outward appearance; and an inner cover 70 that covers the engine 22 on an inner side of the outer cover 60.

Note that in the present embodiment, the outer cover 60 and the inner cover 70 are configured to each cover the whole of the engine 22. However, the present invention is not thus limited, and all that is required is a configuration where either one of the outer cover 60 and the inner cover 70 covers the engine 22. For example, part of the outer cover 60 may expose the inner cover 70. Alternatively, the inner cover 70 may have, of the inner side facing the outer cover 60, a portion that does not cover the engine 22.

As shown in FIGS. 1 and 2, the outer cover 60 has an outer side division structure 62 that can be divided into a plurality of parts 62*p*. In more detail, the outer side division structure 62 is configured by an outer front cover 63, an outer rear cover 64, an outer left cover 65, an outer right cover 66, and an outer upper cover 67, as the plurality of parts 62*p*. Note that in FIG. 2, for convenience, the parts 62*p* are each illustrated with a flat plate shape. However, it goes without saying that each of the parts 62*p* may have a curved shape in cross-sectional view or a shape having a design of irregularities, and so on, on each of the parts 62*p* themselves. The outer front cover 63 is installed forward of the engine 22. An outer peripheral side of the outer front cover 63 is provided with an edge portion 63*a* that bends inwardly (rearwards) and generates an unillustrated recess. Note that a shape of the outer front cover 63 is not specifically limited, and it may be formed in an L shape having a portion where its upper portion side has been bent rearwardly in the side view shown in FIG. 1, for example.

The outer rear cover 64 is installed rearward (in an arrow Re direction) of the engine 22. An outer peripheral side of the outer rear cover 64 is provided with an edge portion 64*a* that bends inwardly (forwards) and generates on its inner side an unillustrated recess. A shape of the outer rear cover 64 is not specifically limited either, and it may be formed in an L shape having a portion where its upper portion side has been bent forwardly in the side view shown in FIG. 1, for example.

The outer left cover 65 is installed leftward of the engine 22. An outer peripheral side of the outer left cover 65 is provided with an edge portion 65*a* that bends inwardly (rightwards) and generates on its inner side an unillustrated recess. For example, the outer left cover 65 is installed more outwardly than each of the edge portions 63*a*, 64*a* of the outer front cover 63 and outer rear cover 64.

The outer right cover 66 is installed rightward of the engine 22. An outer peripheral side of the outer right cover 66 is provided with an edge portion 66*a* that bends inwardly (leftwards) and generates on its inner side an unillustrated recess. For example, the outer right cover 66 is installed more outwardly than each of the edge portions 63*a*, 64*a* of the outer front cover 63 and outer rear cover 64.

The outer upper cover 67 is installed upward of the engine 22. An outer peripheral side of the outer upper cover 67 is provided with an edge portion 67*a* that bends inwardly (downwards) and generates on its inner side an unillustrated recess. A shape of the outer upper cover 67 is not specifically limited either, and it may be provided in a short range sandwiched by the upper portions of the outer front cover 63 and outer rear cover 64 in the side view shown in FIG. 1, for example.

The edge portions 63*a*-67*a* of each of the parts 62*p* configuring the outer cover 60 are joined to another of the parts 62*p* or the inner cover 70 that they face or contact, by a fixing means such as engagement of an unillustrated hook or an unillustrated fastening screw. Note that unillustrated packing (a seal structure) is preferably provided at appropriate positions of the edge portions 63*a*-67*a* of each of the parts 62*p*. As a result, the edge portions 63*a*-67*a* favorably maintain an airtight state with respect to another of the parts 62*p* or the inner cover 70. Some or all of the parts 62*p* of the outer cover 60 may be configured to partially cover the lower surrounding portion 58.

Moreover, the outer side division structure 62 is not limited to as described above, and need only be configured in a manner that the outer side division structure 62 can be divided into two or more of the parts 62*p* in the upper surrounding portion 56. For example, the outer cover 60, without comprising the outer upper cover 67, may be configured to cover an area above the engine 22 with some or all of the outer front cover 63, outer rear cover 64, outer left cover 65, and outer right cover 66 being bent inwardly.

Meanwhile, the inner cover 70 too has an inner side division structure 72 that can be divided into a plurality of parts 72*p* in the present embodiment. The inner side division structure 72 is configured to be divided similarly to the outer side division structure 62. In more detail, the inner side division structure 72 is configured by an inner front cover 73, an inner rear cover 74, an inner left cover 75, an inner right cover 76, and an inner upper cover 77, as the plurality of parts 72*p*.

The inner front cover 73 is installed forward of the engine 22. An outer peripheral side of the inner front cover 73 is provided with an edge portion 73*a* that bends inwardly (rearwards) and generates an unillustrated recess.

The inner rear cover 74 is installed rearward of the engine 22. An outer peripheral side of the inner rear cover 74 is provided with an edge portion 74*a* that bends inwardly (forwards) and generates on its inner side an unillustrated recess. Moreover, the inner rear cover 74 and the outer rear cover 64 form a rear space 68 between themselves in an assembled state of the outboard motor 10. The rear space 68 configures part of an intake air route 68*r* that provides the engine 22 with air for fuel combustion.

For example, the intake air route 68*r* is set to a route by which, when air is taken in to inside the cover 12 from outside, the air is once caused to descend in a downward direction, and then caused to flow in a width direction to rise in an upward direction. Regarding the air, there is provided above the inner rear cover 74 or on an inner surface on an inner side (a forward side) of the inner rear cover 74 a silencer 69 that attenuates air noise (intake air noise) of the air flowing through the rear space 68. Note that the silencer 69 may be provided in the rear space 68.

The inner left cover 75 is installed leftward of the engine 22. An outer peripheral side of the inner left cover 75 is provided with an edge portion 75*a* that bends inwardly (rightwards) and generates on its inner side an unillustrated recess. Moreover, the inner right cover 76 is installed rightward of the engine 22. An outer peripheral side of the inner right cover 76 is provided with an edge portion 76*a* that bends inwardly (leftwards) and generates on its inner side an unillustrated recess.

Note that in the case of there being a structure where the outer cover 60 and the inner cover 70 are joined and a central portion of the outer left cover 65 or outer right cover 66 being curved in a mountain-like shape, a vertex of the outer left cover 65 or the outer right cover 66, and a joining portion (not illustrated) of the outer left cover 65 and inner left cover 75 or the outer right cover 66 and inner right cover 76 may be set to different positions. As a result, when the outboard motor 10 is stored lying on its side, damage of the joining portion can be suppressed while weight of the outboard motor 10 is borne by the outer left cover 65 or outer right cover 66.

The inner upper cover 77 is installed upward of the engine 22. An outer peripheral side of the inner upper cover 77 is provided with an edge portion 77*a* that bends inwardly (downwards) and generates on its inner side an unillustrated recess.

The edge portions 73*a*-77*a* of each of the parts 72*p* configuring the inner cover 70 are also joined to another of the parts 72*p*, a frame of the engine 22, and so on, that they face or contact, by a fixing means such as engagement of an unillustrated hook or an unillustrated fastening screw. Moreover, unillustrated packing (a seal structure) is also preferably provided at appropriate positions of the edge portions 73*a*-77*a* of each of the parts 72*p*. As a result, the edge portions 73*a*-77*a* favorably maintain an airtight state with respect to another of the parts 72*p* or the engine 22. Furthermore, the inner side division structure 72 too is not limited to as described above, and need only be configured in a manner that the inner side division structure 72 is divided into two or more of the parts 72*p* in the upper surrounding portion 56.

Appropriate ones of the parts 72*p* of the inner cover 70 are provided with a structural portion 78 allowing access to a certain place of the engine 22 from outside of the inner cover 70. In the present embodiment, the structural portion 78 is an inner side blank 78*b* penetrating the inner cover 70 connecting the inside and the outside of the inner cover 70.

The inner side blank 78*b* is provided in a place particularly where pre-operation checking (inspection) or maintenance is required in the engine 22. For example, the inner side blank 78*b* corresponds to a facing position of a start-up time check system 22*a* of the engine 22 and a facing position of a plug system 22*b* of the engine 22. The start-up time check system 22*a* is provided with the likes of an oil system for supplying oil into the engine 22 and an electrical system provided with electrical components of the engine 22, for example.

The above outer cover 60 and inner cover 70 may be configured by the same material, or may be configured by different materials. For example, the inner cover 70 is preferably configured by a fiber-strengthened material having high heat insulating properties, and the outer cover 60 is preferably configured by a lighter or more easily molded material than the inner cover 70. As a result, the outboard motor 10 whose outward appearance is configured by the outer cover 60 can have its designability increased. Moreover, the parts 62*p* of the outer cover 60 or the parts 72*p* of the inner cover 70 may be configured by the same material, or each of the parts 62*p* or 72*p* may be configured by different materials.

Each of the parts 62*p* of the outer cover 60 or each of the parts 72*p* of the inner cover 70 preferably have ribs, or the like, that reinforce (increase rigidity of) the parts 62*p*, 72*p* themselves. In other words, each of the parts 62*p* of the outer cover 60 or each of the parts 72*p* of the inner cover 70 may adopt a variety of configurations to reinforce shapes of each or suppress plastic deformation of each.

The outboard motor 10 according to the present embodiment, which is basically configured as above, will have its operation described below.

The outboard motor 10 covers the engine 22 by the outer cover 60 comprising the outer side division structure 62 and the inner cover 70 comprising the inner side division structure 72. The user accesses a work target region of the engine 22 in pre-operation checking or maintenance of the outboard motor 10.

For example, in the case of accessing a front surface of the engine 22, the user first removes the outer front cover 63 of the outer cover 60. The outer front cover 63 is sufficiently light and can be easily removed when compared with the entire outer cover 60.

The inner front cover 73 is exposed in a place where the outer front cover 63 has been removed. Now, in the case of the work target region being in a position facing the inner side blank 78*b* of the inner front cover 73, the user can immediately access the work target region via the inner side blank 78*b*.

Note that in the case of the work target region being in other than the inner side blank 78*b* (the structural portion 78), some of the parts 72*p* (for example, the inner front cover 73) of the inner cover 70 are removed to expose the engine 22. Removal of the inner front cover 73 in this way also enables the user to simply access the work target region. Hence, regarding the inner cover 70 having the inner side division structure 72, the inner side division structure 72 itself allowing each of the parts 72*p* to be individually removed and not including the inner side blanks 78*b* can be said to be the structural portion 78.

Note that the present invention is not limited to the above-described embodiment, and that a variety of modifications thereto are possible in line with the spirit of the invention. For example, the outer side division structure 62 and the inner side division structure 72 are not limited to a configuration of being disassembled correspondingly to each of directions (frontward, rearward, rightward, leftward, and upward) of the engine 22, and may be disassembled into the plurality of parts 62*p*, 72*p* in the same direction (same plane).

Several other embodiments of the outboard motor 10 will be described below. Note that in the following description, an element having the same configuration or same function as in the above-described embodiment will be assigned with the same symbol as in the above-described embodiment, and a detailed description thereof will be omitted.

Second Embodiment

Figure 3:
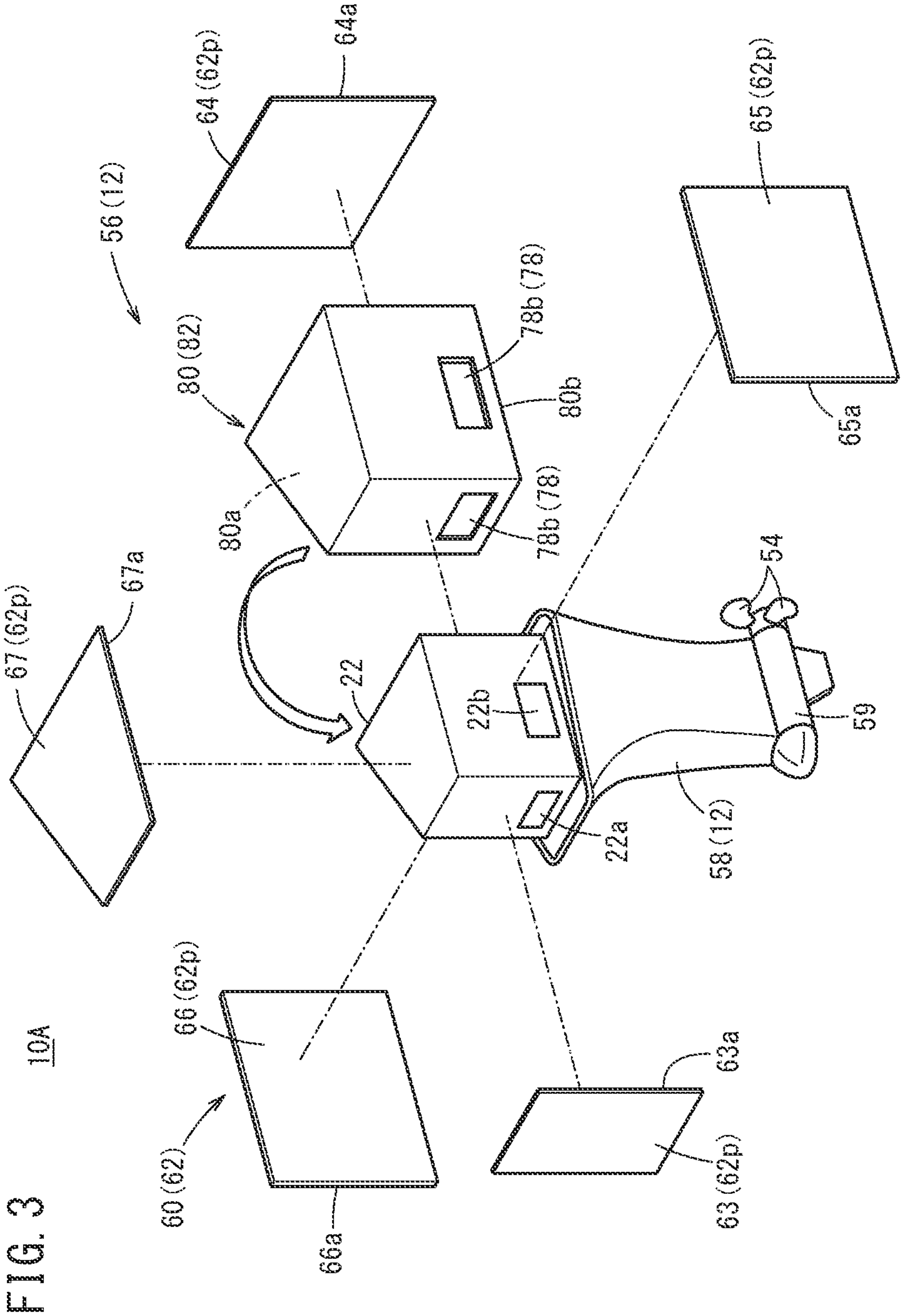
FIG. 3 is a schematic exploded perspective view showing disassembled each of parts of an outer cover and an inner cover of an outboard motor according to a second embodiment.

As shown in FIG. 3, an outboard motor 10A according to a second embodiment differs from the above-described outboard motor 10 in not comprising the inner side division structure 72, and in having applied thereto an inner cover 80 comprising an integral structure 82.

The inner cover 80 has a housing space 80*a* housing on its inside the engine 22 and is configured in a shape of a box having on its lower portion side an opening portion 80*b* communicating with the housing space 80*a*. The inner cover 80 is configured so that placement of said inner cover 80 is performed from an upper side of the engine 22. By the inner cover 80 being the integral structure 82 in this way, manufacturing costs of the inner cover 80 can be cheapened, and strength (rigidity) of the inner cover 80 can be increased. Moreover, the inner cover 80 of the integral structure 82 enables man-hours in an assembly step to be reduced too.

Moreover, at a certain position of the inner cover 80, there is provided the inner side blank 78*b* (the structural portion 78) that allows access to the engine 22 from outside of the inner cover 80. Hence, the user of the outboard motor 10A can access the engine 22 via the inner side blank 78*b*, without removing the inner cover 80, during pre-operation checking or maintenance.

Third Embodiment

Figure 4:
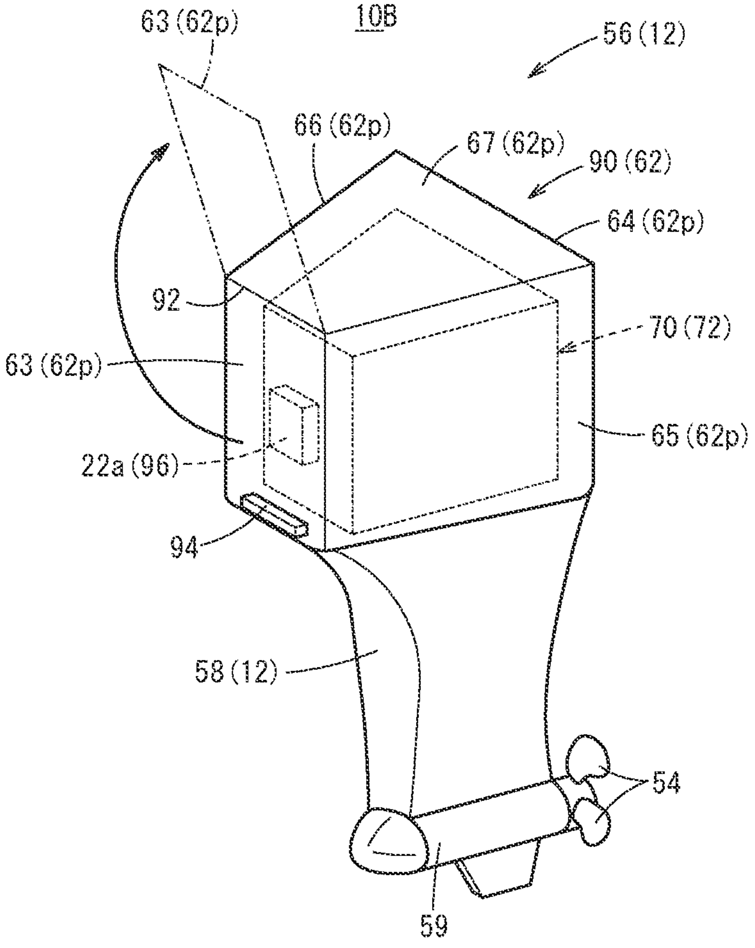
FIG. 4 is a schematic perspective view showing an outer cover and an inner cover of an outboard motor according to a third embodiment.

As shown in FIG. 4, an outboard motor 10B according to a third embodiment is configured so that a certain one of the parts 62*p* (in FIG. 4, the outer front cover 63) of an outer cover 90 having the outer side division structure 62 can revolve with respect to another of the parts 62*p* via a hinge portion 92. Note that the outboard motor 10B adopts as a structure housed inside the outer cover 90 the inner cover 70 comprising the inner side division structure 72. Note that on the inside of the outer cover 90, there may be provided the inner cover 80 comprising the integral structure 82.

The hinge portion 92 is, for example, provided to a front end portion of the outer upper cover 67 and axially supports revolution of the outer front cover 63 in the up-down direction. Furthermore, the cover 12 has a lock mechanism 94 that restricts revolution of the certain one of the parts 62*p* (the outer front cover 63) at a normal time when the outboard motor 10B is being driven. A structure of the lock mechanism 94 is not specifically limited, and there is adopted an appropriate structure enabling that, prior to operation by the user, the outer front cover 63 is closely fitted to the inner cover 70, and, during operation by the user, the outer front cover 63 can revolve.

Note that the outboard motor 10, 10A, 10B may be configured comprising on an outer side (of the inner cover 70, 80) between the outer cover 60, 90 and the inner cover 70, 80 a certain functional portion 96 of the engine 22. As shown in FIG. 4, for example, in the outboard motor 10B, the start-up time check system 22*a* being the functional portion 96 of the engine 22 is provided in the inner front cover 73 positioned on an inner side of the revolution-enabled outer front cover 63. This makes it possible for the user to immediately access the start-up time check system 22*a* by revolving the outer front cover 63, upon pre-operation checking or maintenance, and so on.

Fourth Embodiment

Figure 5:
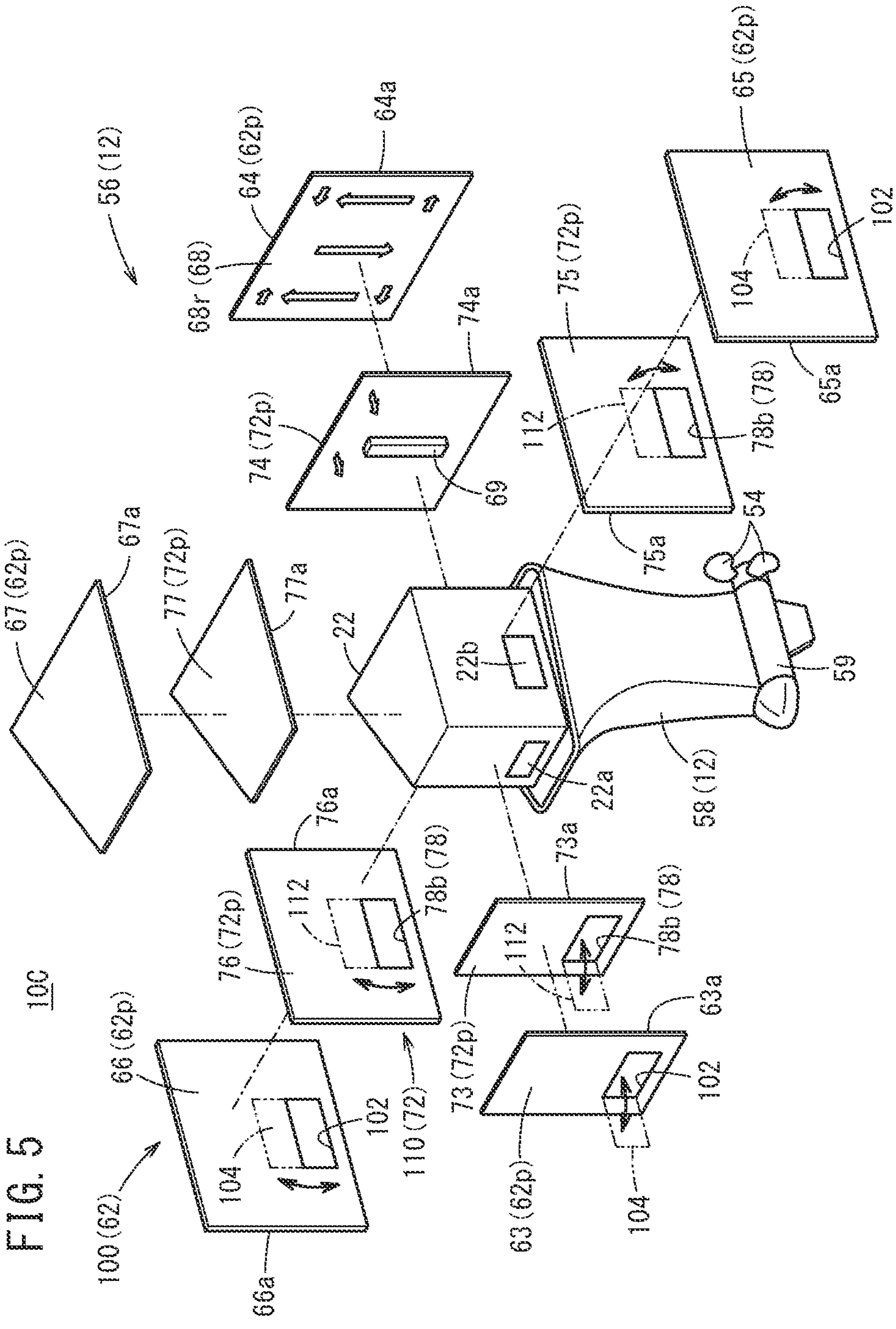
FIG. 5 is a schematic exploded perspective view showing disassembled each of parts of an outer cover and an inner cover of an outboard motor according to a fourth embodiment.

As shown in FIG. 5, an outboard motor 10C according to a fourth embodiment differs from the above-described outboard motors 10, 10A, 10B in having applied thereto an outer cover 100 having an outer side blank 102 in a certain one of the parts 62*p*. In FIG. 5, the outer front cover 63, the outer left cover 65, and the outer right cover 66 are provided with the outer side blank 102.

The outer side blank 102 communicates the inside and the outside of the outer cover 100 (the certain one of the parts 62*p*). This outer side blank 102 is provided in a range facing the structural portion 78 (for example, the inner side blank 78*b*) of the inner cover 70 (or the inner cover 80), and, moreover, is formed with a larger space than the structural portion 78.

Moreover, the outer side blank 102 is fitted with an outer side lid body 104 which can be opened/closed. For example, the outer side lid body 104 is axially supported in a revolution-enabling manner by the certain one of the parts 62*p* via an unillustrated hinge, and allows the structural portion 78 of the inner cover 70 to be exposed with opening of the outer side blank 102.

Furthermore, an inner cover 110 of the outboard motor 10C comprises an inner side lid body 112 in the inner side blank 78*b*. For example, the inner side lid body 112 too, similarly to the outer side lid body 104, is axially supported in a revolution-enabling manner by a certain one of the parts 72*p* via an unillustrated hinge, and allows the engine 22 to be exposed with opening of the inner side blank 78*b*. Note that the inner side lid body 112 may be provided to the above-described inner covers 70, 80. Moreover, the outer side lid body 104 or inner side lid body 112 may be configured to be freely attached/detached in a simple manner (without being revolved) to/from the outer cover 60 or inner cover 70.

The outboard motor 10C configured as above makes it possible for the user to open the outer side lid body 104 and, furthermore, easily access the engine 22 via the structural portion 78 (by opening the inner side lid body 112 of the inner side blank 78*b*), during pre-operation checking or maintenance. Moreover, the outer cover 100 is in the form of the outer side division structure 62, so that even at places not comprising the outer side blank 102, access to the engine 22 can be made easy by removing the parts 62*p*.

Note that regarding the outboard motors 10, 10A-10C according to the first through fourth embodiments, it goes without saying that some of the configurations of the cover 12 in each of the embodiments may be applied to another of the embodiments.

Technical ideas and advantages understandable from the above-mentioned embodiments will be described below.

One aspect of the present invention is the outboard motor 10, 10A-10C comprising the engine 22 and the cover 12, the cover 12 covering the periphery of the engine 22, the cover 12 including: the outer cover 60, 90, 100 that configures the outward appearance; and the inner cover 70, 80, 110 that covers the engine 22 on the inner side of the outer cover 60, 90, 100, the outer cover 60, 90, 100 being the outer side division structure 62 that can be divided into the plurality of parts 62*p*, and the inner cover 70, 80, 110 having the structural portion 78 allowing access to the engine 22.

In the outboard motor 10, 10A-10C, by the outer cover 60, 90, 100 that configures the outward appearance in the periphery of the engine 22 being the outer side division structure 62, it becomes possible for some of the parts 62*p* to be attached/detached by the user during inspection or maintenance. Meanwhile, the inner cover 70, 80, 110 facilitates access to the engine 22 via the structural portion 78. Hence, the outboard motor 10, 10A-10C enables labor of inspection, maintenance, and so on, to be significantly reduced by a simple configuration. Furthermore, by the outboard motor 10, 10A-10C having a configuration including the outer cover 60, 90, 100 and the inner cover 70, 80, 110, it becomes possible too for materials of different characteristics to be applied to protect the engine 22, for example.

Moreover, the outer side division structure 62 enables the outer cover 60, 90, 100 to be divided into forward, rearward, leftward, rightward, and upward of the engine 22. By the outer cover 60, 90, 100 of the outboard motor 10, 10A-10C being thus divided forwards, rearwards, leftwards, rightwards, and upwards, each of the parts 62*p* are sufficiently downsized and lightened. Moreover, since curved surfaces of each of the parts 62*p* become fewer, handling (attachment/detachment, placement, and so on) during work can be made easier.

Moreover, the inner cover 70, 110 is configured as the inner side division structure 72 that can be divided into the plurality of parts 72*p*, and the structural portion 78 allows the engine 22 to be exposed by at least some of the parts 72*p* of the inner cover 70, 110 being removed. By the inner cover 70, 110 too, of the outboard motor 10, 10C being configured as the inner side division structure 72, it becomes possible for manufacturing to be made easier, for downsizing and lightening of each of the parts 72*p* to be promoted, and for attachment/detachment by the user to be speeded up.

Alternatively, the inner cover 80 is the integral structure 82. When the inner cover 80 of the outboard motor 10A is the integral structure 82 in this way, manufacturing costs can be cheapened, and, moreover, work time taken during assembly of the outboard motor 10A, and so on, can be shortened.

Moreover, the structural portion 78 includes the inner side blank 78*b* that faces a certain region of the engine 22 and communicates the inside and the outside of the inner cover 70, 80, 110. As a result, the inner cover 70, 80, 110 can allow the certain region of the engine 22 to be simply accessed via the inner side blank 78*b* during inspection or maintenance.

Moreover, the outer cover 100 has: the outer side blank 102 that communicates the inside and the outside of said outer cover 100; and the outer side lid body 104 that enables the outer side blank 102 to be opened/closed. As a result, in the outboard motor 10C, the engine 22 or inner cover 70 can be simply accessed by opening/closing the outer side lid body 104, without the outer cover 100 having to be removed.

Moreover, the outer side blank 102 is provided in a range facing the structural portion 78, and the outer side lid body 104 allows the structural portion 78, or the functional portion 96 of the engine 22 provided in the inner cover 70, to be exposed with opening of the outer side blank 102. As a result, in the outboard motor 10C, the structural portion 78 or functional portion 96 of the inner cover 110 can be even more simply accessed by opening the outer side lid body 104, so workability of inspection or maintenance, and so on, of the outboard motor 10C can be improved.

Moreover, one of the parts 62*p* of the outer cover 90 can be revolved with respect to another of the parts 62*p* of said outer cover 90. Hence, in the outboard motor 10B, by revolving the one of the parts 62*p* during pre-operation checking, and so on, and thereby exposing the engine 22 or inner cover 70, work can be easily implemented in a short time. Specifically, in the case of the one of the parts 62*p* being the outer front cover 63, the user can access from forward of the outboard motor 10 installed in a stern, so work can be even further speeded up.

Moreover, the outer cover 60 and the inner cover 70 form the rear space 68 by being separated by a certain distance from each other in the rear portion of the engine 22. As a result, even if the outboard motor 10 collides with a structure in a periphery (for example, a pier) during reversing of the ship body Sh, the outer cover 60 will first be dented, and damage of the engine 22 can be suppressed.

Moreover, the cover 12 has in the rear space 68 the intake air route 68*r* for taking air into the engine 22, and comprises the silencer 69 that suppresses air noise during air intake of the engine 22. Hence, by effectively utilizing the rear space 68 in the outboard motor 10, air intake to the engine 22 can be favorably performed, and, moreover, air noise during air intake can be suppressed.

DESCRIPTION OF REFERENCE NUMERALS

10, 10A-10C . . . outboard motor
12 . . . cover
22 . . . engine
56 . . . upper surrounding portion
60, 90, 100 . . . outer cover
62 . . . outer side division structure
62*p*, 72*p* . . . parts

68 . . . rear space
68*r* . . . intake air route
69 . . . silencer
70, 80, 110 . . . inner cover
72 . . . inner side division structure
78 . . . structural portion
78*b* . . . inner side blank
82 . . . integral structure
102 . . . outer side blank
104 . . . outer side lid body

What is claim is:

1. An outboard motor comprising:
an engine;
a drive shaft;
a gear mechanism;
a propeller mechanism; and
a cover covering a periphery of the engine, the drive shaft, the gear mechanism, and the propeller mechanism,
the cover including:
an upper surrounding portion that covers frontward, rearward, leftward, rightward, and upward of the engine; and
a lower surrounding portion that covers the drive shaft, the gear mechanism, and the propeller mechanism located on a lower side of the engine,
the upper surrounding portion including:
an outer cover that configures an outward appearance; and
an inner cover that covers the engine on an inner side of the outer cover,
the outer cover being an outer side division structure that is configured to be divided into an outer front cover that covers frontward of the engine, an outer rear cover that covers rearward of the engine, an outer left cover that covers leftward of the engine, an outer right cover that covers rightward of the engine, and an outer upper cover that covers upward of the engine,
the inner cover having a structural portion allowing access to the engine,
the structural portion including an inner side blank that faces a certain region of the engine and communicates inside and outside of the inner cover,
the inner side blank including
a first inner side blank that is provided at a position facing a plug of the engine,
a second inner side blank that is arranged facing an oil system for supplying oil into the engine, and
a third inner side blank that is provided at a position facing an electrical component of the engine.

2. The outboard motor according to claim 1, wherein
the inner cover is configured as an inner side division structure that is configured to be divided into a plurality of parts, and
the structural portion allows the engine to be exposed by at least some of the parts of the inner cover being removed.

3. The outboard motor according to claim 1, wherein
the inner cover is an integral structure.

4. The outboard motor according to claim 1, wherein
the outer cover has: an outer side blank that communicates inside and outside of said outer cover; and an outer side lid body that enables the outer side blank to be opened/closed.

5. The outboard motor according to claim 4, wherein
the outer side blank is provided in a range facing the structural portion, and
the outer side lid body allows the structural portion, or a functional portion of the engine provided in the inner cover, to be exposed with opening of the outer side blank.

6. The outboard motor according to claim 1, wherein
one of the parts of the outer cover is configured to be revolved with respect to another of the parts of said outer cover.

7. The outboard motor according to claim 1, wherein
the outer cover and the inner cover form a rear space by being separated by a certain distance from each other in a rear portion of the engine.

8. The outboard motor according to claim 7, wherein
the cover has in the rear space an intake air route for taking air into the engine, and comprises a silencer that suppresses air noise during air intake of the engine.

* * * * *